(12) United States Patent
Fukushima et al.

(10) Patent No.: US 6,334,885 B1
(45) Date of Patent: Jan. 1, 2002

(54) METHOD OF SOLIDIFYING STEEL-MAKING SLAG AND MATERIAL PRODUCED BY THE METHOD

(75) Inventors: Yasumasa Fukushima; Hisahiro Matsunaga; Hiroyuki Tobo; Makiko Nakagawa; Masato Takagi; Masato Kumagai, all of Chiba (JP)

(73) Assignee: Kawasaki Steel Corporation, Hyogo (JP)

( * ) Notice: Subject to any disclaimer, the term of this patent is extended or adjusted under 35 U.S.C. 154(b) by 0 days.

(21) Appl. No.: 09/417,053

(22) Filed: Oct. 13, 1999

(30) Foreign Application Priority Data

| Oct. 14, 1998 | (JP) | ............................................ | 10-291583 |
| May 13, 1999 | (JP) | ............................................ | 11-132412 |
| May 28, 1999 | (JP) | ............................................ | 11-149668 |
| Jul. 14, 1999 | (JP) | ............................................ | 11-199878 |

(51) Int. Cl.$^7$ ............................................... C22B 7/04
(52) U.S. Cl. ............................... 75/746; 75/751; 65/19; 106/705; 106/714; 106/737; 106/DIG. 1
(58) Field of Search ........................ 75/746, 751; 65/14; 106/705, 714, 737, DIG. 1

(56) References Cited

U.S. PATENT DOCUMENTS

| 3,582,377 A | * | 6/1971 | Hays et al. | ..................... 264/71 |
| 4,049,439 A | | 9/1977 | Nakamura et al. | |
| 4,397,801 A | * | 8/1983 | Minnick | ..................... 264/140 |
| 5,232,496 A | * | 8/1993 | Jennings et al. | ............ 106/713 |
| 5,393,342 A | * | 2/1995 | Hooykaas | .................... 106/714 |

FOREIGN PATENT DOCUMENTS

| DE | 2040484 | 2/1972 |
| JP | 58-002260 | 1/1983 |
| JP | 59-069966 | 9/1984 |
| JP | 01-126246 | 5/1989 |
| JP | 06-092696 | 4/1994 |
| JP | 10-152364 | 6/1998 |

OTHER PUBLICATIONS

N. Isu et al., Mechanical Property Evolution During Auto-claving Process of Aerated Concrete Using Slag: I, Tobermorite Formation and Reaction Behavior of Slag, *Journal of the American Ceramic Society*, vol. 77, No. 8, Aug. 1994, pp. 2088–2092.

Hawley's Condensed Chemical Dictionary, Richard J. Lewis Ed. 12th edition. p. 239. 1993.*

* cited by examiner

*Primary Examiner*—Roy King
*Assistant Examiner*—Tima McGuthry-Banks
(74) *Attorney, Agent, or Firm*—Young & Thompson

(57) ABSTRACT

A method of solidifying a steel-making slag is performed by subjecting a mixture of a steel-making slag containing at least about 50% by weight of a powdery steel-making slag having a particle size not greater than about 5 mm and a substance containing at least about 30% by weight of $SiO_2$ (e.g., a fly ash and/or the fine powder of a granulated blast furnace slag) to a hydration reaction. The resulting solidified material contains at least about 20% of a tobermorite phase, has high strength and is suitable as an inorganic material useful as a roadbed material, building and civil engineering materials, etc.

10 Claims, No Drawings

METHOD OF SOLIDIFYING STEEL-MAKING SLAG AND MATERIAL PRODUCED BY THE METHOD

FIELD OF THE INVENTION

The present invention relates to a method of solidifying a steel-making slag, and more particularly to a technique of mixing a powdery and granular steel-making slag that is produced in large quantities as a by-product of steel-making, with a substance containing at least about 30% by weight of $SiO_2$, such as the fine powder of granulated blast furnace slag, fly ash, or the like, and to the material formed thereby. The $SiO_2$-containing substance is generated in large quantities during the combustion of coal in a coal thermal power plant and has hitherto been almost wasted. The solidified product of the mixture can be utilized as roadbed materials, building and civil engineering materials, etc.

BACKGROUND OF THE INVENTION

In a continuous steelworks using a blast furnace, a converter, etc., in addition to molten iron and molten steel, a large amount of so-called "smelting slag" is generated. Efforts to utilize such a slag as roadbed materials, etc., have been made for many years. For example, Japanese Patent Laid-open No. 59205/1975 proposes a technique of adding sodium hydroxide, etc., to a granulated blast furnace slag (obtained as fine granules by quenching the slag in a molten state by spraying high-pressure water thereon) and subjecting the mixture to a hydrothermal treatment at a pressure higher than atmospheric pressure to increase the hardening capacity thereof and solidify the mixture. Also, Japanese Patent Laid-Open No. 017247/1988 proposes a technique of adding an alkali stimulant made of slaked lime or cement to a mixed powder of powdery blast furnace slag and fly ash followed by curing in an autoclave to solidify the mixture. By employing such a technique, the utilization of blast furnace slags as roadbed materials has been possible to some extent.

On the other hand, with the recent advancement of steel making techniques, steel-making slag has taken on increasingly complicated chemical composition and characteristics. Thus, present-day steel-making slags include a molten iron pre-treated slag generated in a so-called "molten iron pre-treatment" for initially removing silicon, phosphorus, and sulfur from molten iron prior to a steel making step, converter slag and electric furnace slag formed by oxygen smelting molten iron in a converter or an electric furnace, melt reducing furnace slag generated in the case of directly melt-reducing chromium ore and the like with a carbon material for producing stainless steel by a converter at a low cost, secondary refining slag generated in the case of separately treating molten steel from a converter for increasing the quality of the steel material (the treatment is called secondary refining and includes vacuum degassing, ladle refining, etc.), and stainless steel slag generated by refining stainless steel and the like. Because free-CaO exists unavoidably in these slags, which is powdered after being expanded by hydration or carbonation thereof, when such a steel-making slag is solidified as is, the slag cannot be used as roadbed materials or building and civil engineering materials.

Accordingly, Japanese Patent Laid-Open No. 253349/1996 proposes subjecting free-CaO to an aging treatment for physically and chemically stabilizing free-CaO (after adding a silica-based or silica-alkali-based substance such as a waste material of cement or concrete to free-CaO, exposing the mixture to steam, warm water, or air for a long period of time). Also, Japanese Patent Laid-Open No. 259946/1996 discloses a technique of using a steel-making slag or a molten iron pre-treated slag subjected to a magnetic separation treatment and a stabilization treatment as a roadbed materials, etc., together with a coarse-ground solid material obtained by mixing coal ash or excavation dirt. This technique effectively utilizes slag subjected to an aging treatment as a steel-making slag roadbed material together with a large amount of other waste material (coal ash or excavation dirt). Furthermore, Japanese Patent Laid-Open No. 152364/1998 proposes a technique of using a steel-making slag as an aggregate, combining the slag with cement, fine powder of a granulated blast furnace slag, fly ash, silica fume, etc., as a binder, and hardening the combined mixture by natural or steam curing under atmospheric pressure or by an autoclave treatment.

However, the technique described in Japanese Patent Laid-Open No. 253349/1996, merely prevents the expansion of a steel-making slag and the resultant formation of powder, but the strength of the slag after aging is insufficient as compared with macadam, etc. Therefore, such a slag could only be utilized as a temporary roadbed material or as building and civil engineering materials. Also, the technique described in Japanese Patent Laid-Open No. 259946/1996, requires using the slag together with a large amount of a waste material (coal ash or excavation dirt) and there is the drawback that a large amount of the steel-making slag itself cannot be treated. Furthermore, in the technique described in Japanese Patent Laid-Open No. 152364/1998, a steel-making slag can be used as an aggregate without applying aging but there are problems that the amount of steel-making slag that can be used is small and, on the other hand, the amount of fly ash to be mixed therewith, generated in large quantities in a coal thermal power plant, becomes too small. Also, as is seen from the examples of the technique, converter slag is used separately as a coarse aggregate and a fine aggregate and despite the fact that the slag is used as a coarse aggregate up to about 59%, the strength remains insufficient.

As mentioned above, the effective utilization of a steel-making slag has not yet been realized because of the technical difficulties, and therefore the stockpiles of slag continue increasing in steelworks. Accordingly, the effective utilization of steel-making slags is highly desirable. Also, regarding the substances containing at least about 30% by weight of $SiO_2$, such as fly ash and granulated blast furnace slag generated in large quantities in other places, the effective utilization thereof is desired as well.

OBJECTS OF THE INVENTION

Objects of this invention are to provide a method of solidifying a steel-making slag capable of reliably and efficiently solidifying powdery and granular steel-making slag as an inorganic material useful as roadbed materials, building and civil engineering materials, etc., and also capable of effectively utilizing. a substance containing at least about 30% by weight of $SiO_2$, such as fly ash generated in large quantities in coal thermal power plants, most of which is wasted at present.

SUMMARY OF THE INVENTION

For achieving the above-described objects, the present inventors have made various investigations, by paying special attention to kneading powdery and granular steel-making slag with a substance containing at least about 30% by weight of $SiO_2$, such as fly ash and fine powder of a granulated blast furnace slag, in the presence of water, and by carrying out a heat treatment in high-pressure steam (for example, autoclave curing), of the treatment conditions, the properties of the treated material, the crystal texture, etc.

As a result, it has been found that when a steel-making slag containing at least about 50% by weight of powdery steel-making slag having a particle size of not greater than about 5 mm is mixed with at least one member selected from the group consisting of fly ash and blast furnace slag, and they are reacted by heating in the presence of water or in a high-pressure steam atmosphere, a tobermorite phase ($5CaO \cdot 6SiO_2 \cdot 5H_2O$) is formed and the tobermorite phase contributes to the stabilization of said slag and increases the slag strength after solidification.

Also, it has been found that in the mixture of the steel-making slag with the fine powder of granulated blast furnace slag, there is a latent hydraulic property that the fine powder of the granulated blast furnace slag is hardened by itself in the presence of an alkali stimulant and water may be utilized. In this case, as the alkali stimulant, CaO or $Na_2O$ each containing powdery and granular steel-making slag can be utilized. Also, based on this knowledge, investigations have been further made and the present invention shown below has been accomplished.

That is, according to the present invention, there is provided a method of the solidifying a steel-making slag which comprises solidifying a mixture of a steel-making slag containing at least about 50% by weight of a powdery steel-making slag having particle size of not larger than about 5 mm and a substance containing at least about 30% by weight of $SiO_2$ by a hydration reaction; and also there is provided a solidified material containing at least about 20% of a tobermorite phase obtained by the above-described method.

In addition, in the above-described solidification method and solidified material, it is preferred that the above-described substance containing at least about 30% by weight of $SiO_2$ is at least one member selected from the group consisting of granulated blast furnace slag and fly ash, and it is more preferred that they be solidified by the following compounding ratio.

Namely, it is more preferred that when the above-described substance containing at least about 30% by weight of $SiO_2$ is granulated blast furnace slag, the compounding ratio of the above-described mixed powder is from about 60 to about 80% by weight of steel-making slag and from about 40 to about 20% by weight of granulated blast furnace slag; or that when the above-described substance containing at least about 30% by weight of $SiO_2$ is fly ash, the compounding ratio of the above-described mixed powder is from about 60 to about 80% by weight of steel-making slag and from about 40 to about 20% by weight of fly ash; or further that when the above-described substance containing at least about 30% by weight of $SiO_2$ is made of granulated blast furnace slag and fly ash, the compounding radio of the above-described mixed powder is from about 60 to about 80% by weight of steel-making slag, from about 20 to about 13% by weight of granulated blast furnace slag, and from about 20 to about 7% by weight of fly ash.

Also, in the above-described solidification method and solidified material, it is preferred that the above-described steel-making slag be at least one member selected from the group consisting of molten iron pre-treated slag, melt reducing furnace slag, converter slag electric furnace slag, secondary refining slag, and stainless steel slag.

Furthermore, when the above-described substance containing at least about 30% by weight of $SiO_2$ is the granulated blast furnace slag, it is more preferred that the particle size of the fine powder of the granulated blast furnace slag be 100 μm or less.

Also, in each of the cases described above, it is preferred that in the solidification method and the solidified material obtained by the method, at least one member selected from the group consisting of oxides, hydroxides and carbonates of alkali metals or alkaline earth metals be further added to the above-described mixture in an amount of from about 0.5 to about 10% by weight, followed by solidification.

Moreover, in the present invention, by applying the following method to each of the above-described methods, a solidified material having a higher strength can be obtained.

That is, in the preferred method, after pre-treating the above-described steel-making slag with water, the mixture of slag and the substance containing at least about 30% by weight of $SiO^2$ is heated in high-pressure stream. In this case, it is preferred that the above-described heating be carried out at a temperature of from about 120 to about 260° C. for 2 to about 48 hours. Carbon dioxide gas may be added to the above-described high-pressure steam.

DETAILED DESCRIPTION OF THE INVENTION

Then, the embodiment of the practice of this invention is explained together with the circumstances of attaining the present invention.

Usually, in concrete, pebbles having large particle sizes (about 40 mm or more) are used as a coarse aggregate, sands having small particle size (about 5 mm or less) are used as a fine aggregate, the coarse aggregate is usually used in an amount of about twice the amount of the fine aggregate, for strength. However, in this invention, it is necessary to use a steel-making slag containing at least about 50% by weight of a powdery steel-making slag having a particle size not greater than about 5 mm as the raw material. This is not only for reactivity but also because if the content of the slag particles having a particle size not greater than about 5 mm is less than about 50%, molding becomes difficult.

Also, it is preferred that the above-described steel-making slag be at least one member selected from the group consisting of molten iron pre-treated slag, melt reducing furnace slag, converter slag, electric furnace slag, secondary refining slag, and stainless steel slag.

In addition, for facilitating the understanding of this invention, the invention will be successively explained for two cases of using fly ash and using the fine powder of a granulated blast furnace slag, each having a different solidification mechanism, as the substance containing at least about 30% by weight of $SiO_2$.

Generally, steel-making slag contains CaO and $SiO_2$ as the main constituents. In these components, because CaO reacts with $H_2O$ to cause breaking by expansion of the slag itself, to prevent the occurrence of breaking by expansion, it is necessary to previously convert CaO into another substance. Also, fly ash generally contains $SiO_2$ and $Al_2O_3$ as the main constituents.

First, the present inventors selected a powdery and granular molten iron pre-treated slag as the steel-making slag containing at least about 50% by weight of a powdery steel-making slag having a particle size not greater than about 5mm. After mixing the slag with the fly ash, the mixture was reacted by exposing it to steam, and it was determined the a $SiO_2$—CaO—$Al_2O_3$—$H_2O$—based composition formed in this case. Also, it was found that a tobermorite phase existed in the composition. Because it is well known that the tobermorite phase increases the strength of a solidified material, the inventors intended to utilize the function of the tobermorite phase in the solidification of other kinds of steel-making slag and made further investigations. In this case, it has also been found that by adding the fine powder of a blast furnace slag, the strength of the solidified material is increased.

According to these investigations, it has also been found that to form a sufficient amount of tobermorite phase for increasing the strength of a solidified material and preventing the occurrence of powdering by expansion, a mixed powder made of the steel-making slag containing at least about 50% by weight of a powdery steel-making slag having a particle size not greater than about 5 mm and a fly ash as the main constituents preferably added with water or a molded material formed by molding the mixed powder to a predetermined form (for example, a rectangular parallelepiped) in the presence of water may be heated under high-pressure steam. In this case, to increase the strength of the solidified material, the amount of tobermorite phase formed after the heat treatment is preferably from about 20 to about 100% by weight, more preferably from about 50 to about 100% by weight of the total solidified material. Also, at the same time, it has been found that a hydrogarnet phase ($3CaO \cdot Al_2O_3 \cdot 2SiO_2 \cdot 3H_2O$), which is described later, is disadvantageous for the solidification of the above-described molded material and it is better that the formed amount thereof be limited to preferably 20% by weight or less, more preferably 10% by weight or less. In addition, the formed amounts of these phases were determined by quantitative analysis using a powder X-ray diffraction.

Now, to practice the method of this invention, it is preferred that before subjecting the steel-making slag containing at least about 50% by weight of a powdery steel-making slag having a particle size not greater than about 5 mm to a hot-pressing treatment, the slag is pre-treated with water. This is because the expansion reaction of the slag occurs faster than the solidification reaction, and the slag causes breaking by expansion, whereby there is a possibility that a desired molded material cannot be obtained.

As a practical means of heating the above-described mixed powder under high-pressure steam, the use of an autoclave which is a closed-system pressure vessel is preferred. This is because the vapor pressure (the saturated pressure) of water is 1 atm at 100° C. but when an autoclave is used, the vapor pressure of water can be increased at a higher temperature. When the above-described mixed powder is heated under such a high-pressure steam, the various reaction rates of the substances forming the mixed powder can be greatly accelerated. In the invention, by utilizing the reaction accelerating action, the substances contained in the steel-making slag and the fly ash are reacted with each other to form the tobermorite phase useful for the solidification of the molded material.

Also, to form the tobermorite phase in an amount suitable for the above-described solidified material, it is preferred that the compounding ratio of the steel-making slag containing at least about 50% by weight of powdery steel-making slag having particle size not greater than about 5 m and the fly ash be from about 60 to about 80% by weight of the steel-making slag and from about 40 to about 20% by weight of the fly ash. More preferably, the compounding ratio thereof is from about 50 to about 80% by weight of the steel-making slag and from about 50 to about 20% by weight of the fly ash. The reason is that if the amount of the steel-making slag exceeds the above-described upper limit range and the amount of the fly go ash is less than the lower limit range, a sufficient amount of the tobermorite phase is difficult to form. Also, if the amount of the steel-making slag is less than the above-described lower limit range and the amount of the fly ash exceeds the upper limit range, the hydrogarnet phase is formed, whereby a sufficient strength of the molded material is not obtained.

Furthermore, in this invention, it is preferred that heating in an autoclave be carried out at a temperature of from about 120 to about 260° C. for from about 2 to about 48 hours. More preferably, it is recommended to carry out heating at a temperature of from about 160 to about 230° C. for from about 2 to about 24 hours. The reason is that if the heating temperature is lower than the above-described lower limit, the formation reaction of the tobermorite phase is retarded, whereby a sufficient amount of the tobermorite phase is not formed and the strength of the solidified material becomes insufficient. On the other hand, if the heating temperature exceeds the above-described upper limit, the reaction is excessively accelerated, whereby a hydrogarnet phase or a xonotlite phase is formed and it sometimes happens that a solidified material having a sufficient strength is not obtained. These phenomena also happen in the case of the heating time. That is, if the time is shorter than the above-described lower limit time, the reaction does not proceed sufficiently and a sufficient amount of the tobermorite phase is not formed, while if the treatment time exceeds the upper limit time, the reaction is excessively accelerated to form a hydrogarnet phase, and in either case, the solidified material having a sufficient strength is not obtained.

Also, in the invention, attention has been paid to adding carbon dioxide gas to the above-described high-pressure steam because by the addition thereof, calcium carbonate is formed and the solidification is accelerated. However, because the proper addition amount thereof varies according to the kind of steel-making slag used, the amount is not limited in this invention. In addition, as the raw materials of the mixed powder, other than the steel-making slag and the fly ash, small amounts of blast furnace slag, silica flour, concrete waste, etc., may be compounded.

Next, the use of granulated blast furnace slag as the substance containing at least about 30% by weight of $SiO_2$ will be explained.

Steel-making slag contains unreacted calcium oxide (CaO) and calcium hydroxide ($Ca(OH)_2$) formed by the reaction of CaO and water, and the CaO and $Ca(OH)_2$ are alkaline. On the other hand, the fine powder of a granulated blast furnace slag has a latent hydraulic property which is hardened by the action of an alkali stimulant. Accordingly, by reacting the fine powder of the granulated blast furnace slag and the steel-making slag in the presence of water, a hardened material is formed.

In general, in blast furnace slag, $SiO_2$, $Al_2O_3$, etc., react with CaO of limestone and the reaction products float in a molten state at a high temperature. Also, blast furnace slag contains MgO, MnO, sulfides, and other minor components other than CaO, $SiO_2$, and $Al_2O_3$. The granulated blast furnace slag used in this invention is of sand-grain-form and glassy slag having a small particle size obtained by quenching such a blast furnace slag. When the fine powder obtained by finely grinding the glassy granulated blast furnace slag is mixed with an alkaline component and kneaded with water, the fine powder begins to be solidified by the stimulus action of the alkali, and the strength is low at first but gradually increases. The property that the granulated blast furnace slag itself is solidified by the stimulus of the alkaline component is called latent hydraulic property. The fine powder of the granulated furnace slag itself does not show a hydraulic property but when the fine powder is subjected to the stimulus of an alkali in the presence of water, the fine powder shows the latent hydraulic property. As the alkali stimulant, there are the oxides, hydroxides, carbonates, sulfates, etc., of alkali metals or alkaline earth metals. In this invention, a powdery and granular steel-making slag is utilized as an alkaline stimulant and the powdery and granular steel-making slag is changed to a stabilized hardened material.

That is, it has been found that the steel-making slag containing the unreacted material calcium oxide (CaO) and calcium hydroxide ($Ca(OH)_2$) formed by the reaction of CaO and water becomes an alkaline stimulant and when the slag is mixed with the fine powder of a granulated blast furnace slag and water, the fine powder of the granulated blast furnace slag is hardened to form a solidified material and reduces breaking by expansion of the steel-making slag, whereby the present invention is accomplished.

In this invention, the steel-making slag containing at least about 50% by weight of a powdery steel-making slag having a particle size not greater than about 5 mm is not only used as an aggregate but also used as an alkaline stimulant. Also, when the particle size of the fine powder of the granulated blast furnace exceeds 100 μm, the reacted amount is small and hardening may become insufficient, which is undesirable. The mixing amount of the fine powder of the granulated blast furnace may be controlled according to the characteristics of the components of the granular steel-making slag but is usually in the range of from about 10 to about 90% by weight of the dry base. In addition, when mixing the steel-making slag containing at least about 50% by weight of a powdery steel-making slag having a particle size not greater than about 5 mm with the fine powder of the granulated blast furnace slag, it is preferred that they be kneaded at the beginning of mixing or during mixing because in this case, the generation of dust is prevented and also by the continuous supply of water to the above-described mixture, the solidification thereafter proceeds continuously and quickly. It is better that the kneading working temperature be 60° C. or lower. If the temperature exceeds 60° C., the reaction proceeds too fast and thus the workability of the mixture is greatly decreased, which is undesirable.

It is preferred that in the case of the above-described solidification, the mixed powder be solidified by autoclave curing, whereby the hardening rate is accelerated. In this case, it is preferred that as in the case of hardening with the fly ash, before applying the hot-pressing treatment, the steel-making slag containing at least about 50% by weight of a powdery steel-making slag having a particle size not greater than about 5 mm be pre-treated with water. Because the development of the latent hydraulic property of the powder of the granulated blast furnace slag extends over a very long time, the hardening acceleration by autoclave curing is effective. As the autoclaving conditions, it is preferred to carry out autoclaving at a temperature of from about 120 to about 260° C. for 2 to about 48 hours. It is more preferred that the pressure be from about 5 to about 15 kg/cm$^2$ and that the temperature be from about 150 to about 200° C.

The autoclave curing is also called high-temperature high-pressure curing, that is, a product is placed in a closed pot and usually cured under the conditions of a temperature of about 180° C. and a pressure of about 10 atms. In autoclave curing, a hydrothermal reaction occurs to form a tobermorite phase, immediately after curing, long-term strength develops, and a high strength is obtained in a short time. Also, in autoclave curing, it is preferred that after carrying out precuring, the product be maintained at a high pressure and a high temperature for about 5 to about 24 hours. By the autoclave curing, the fine powder of the granulated blast furnace slag can form a so-called silicate hardened product of $CaO$—$SiO_2$—$H_2O$ having a compressive strength of from about 200 to about 450 kgf/cm$^2$. When the fine powder is cured under high-pressure high-temperature steam, silica and calcium in the hydraulic substance are combined with each other to form a gel or a quasi-crystal of a firm tobermorite phase. That is, at room temperature, even inactive quartz-form silica reacts with calcium to form a firm calcium silicate. The process of forming the tobermorite phase is by forming more stabilized $5CaO \cdot 6SiO_2 \cdot 5H_2O$ (tobermorite phase) in the process of high-temperature high-pressure curing of a hydrate $3CaO \cdot 2SiO_2 \cdot 3H_2O$ formed at room temperature. In addition, when autoclave curing is carried out in the presence of water and $CO_2$, hardening by the carbonation of slag components occurs and a hardened product having a higher strength can be obtained by solidification.

Also, in this invention, it is suitable to supply an alkali by adding one or two kinds selected from the oxides, hydroxides and carbonates of alkali metals or alkaline earth metals to the mixture of the steel-making slag containing at least about 50% by weight of powdery steel-making slag having a particle size not greater than about 5 mm and the fine powder of granulated blast furnace slag in an amount of from about 0.5 to about 10% by weight of the whole. If the addition amount is less than about 0.5% by weight, the addition effect is sometimes poor owing to the small amount thereof, while if the addition amount exceeds 10% by weight, the reaction proceeds so fast as sometimes to cause inconvenience in the mixing work. Thus, the upper limit is defined to be about 10% by weight.

Furthermore, the present inventors made investigations concerning the case of adding the above-described fly ash to the mixed powder of the steel-making slag containing at least about 50% by weight of a powdery steel-making slag having a particle size not greater than about 5 mm and the fine powder of the granulated blast furnace slag. As a result, it has been found that by adding the fly ash, the formation of the tobermorite phase is accelerated by the synergism of the solidification functions. Thus, the addition of fly ash is also included in the invention.

In addition, the substance containing at least about 30% by weight of $SiO_2$ used in this invention is not limited to fly ash and the fine powder of a granulated blast furnace slag but also includes any substances containing at least about 30% by weight of $SiO_2$ (for example, the ash of "straw", "chaff", etc.) may be used.

The following examples are intended to illustrate the present invention more practically but not to limit the invention in any way.

EXAMPLE (1) The case in which the substance containing at least about 30% by weight of $SiO_2$ is fly ash Each of the steel-making slags of the compositions shown in Table 1 and the powder of the fly ash having the composition shown in the same table were mixed in each of the predetermined compounded ratios shown in Table 2 and Table 3 to prepare various kinds of compounded raw materials. Each of the compounded raw materials was mixed with 5% by weight of water, the mixed powder was poured in a stainless steel mold (inside diameter 40 mm×40 mm×160 mm), and molded under a fixed pressure. Each compact drawn from the mold was placed in an autoclave and many tests of curing the compacts at a variety of temperatures and times shown in Table 2 and Table 3 were carried out. In addition, the chromium or melt reducing furnace slag and the stainless steel refining decarburization furnace slag in Tables 1 to 3 will be referred to as a melt reducing furnace slag ad a stainless steel slag, respectively.

Regarding each compact obtained by autoclave curing, that is, each solidified material, the specific gravity (according to JIS R 2205), the compressive strength (according to JIS R 2553), and the peak intensities of a tobermorite phase and a hydrogarnet phase (by powder X-ray diffraction method) were measure. In addition, the intensities of the X-ray diffraction peaks were evaluated by four stages of intense, moderate, weak, and "none" by using the peak corresponding to the (111) face of silicon added to as a standard sample as a standard.

These results are shown in Table 2 and Table 3. In addition, the number of tests of each compact under the same compounded ratio and conditions is three and the values shown in Table 2 and Table 3 are the average values of the three.

TABLE 1

| Kind of steel-making slag | | (wt. %) | | | | | |
|---|---|---|---|---|---|---|---|
| | | SiO$_2$ | CaO | Al$_2$O$_3$ | MgO | t-Fe | P$_2$O$_5$ |
| Molten iron pre-treatment slag | A | 20 | 41 | 7 | 3 | 10 | 3 |
| Converter slag | B | 14 | 52 | 2 | 4 | 12 | 3 |
| Electric furnace slag | C | 20 | 51 | 11 | 8 | 2 | 0 |
| Chromium ore melt reducing furnace slag | D | 16 | 37 | 18 | 17 | 2 | 0 |
| Secondary refining slag | E | 12 | 41 | 19 | 6 | 5 | 2 |
| Stainless steel refining decarburization furnace slag | F | 27 | 48 | 3 | 3 | 3 | 0 |
| Fly ash | — | 50 | 10 | 24 | 2 | 4 | 1 |

Note) t-Fe means a total iron components.

TABLE 2

| No. | Kind of steel-making slag | Existing ratio (%) of particles ≦ 5 mm | Steel-making Slag (wt. %) | Fly ash (wt. %) | Autoclave Curing Temperature (° C.) | Time (hr.) | X-ray diffraction peak Tobermorite | Hydrogarnet | Specific gravity | Compressive strength (kgf/cm$^2$) | Remarks |
|---|---|---|---|---|---|---|---|---|---|---|---|
| 1 | A | 50 | 90 | 10 | 180 | 6 | Moderate | none | 2.4 | 225 | Example |
| 2 | A | 50 | 80 | 20 | 180 | 6 | Moderate | none | 2.4 | 250 | Example |
| 3 | A | 50 | 70 | 30 | 180 | 6 | Intense | none | 2.2 | 250 | Example |
| 4 | A | 50 | 60 | 40 | 180 | 6 | Intense | none | 2.2 | 250 | Example |
| 5 | A | 50 | 50 | 50 | 180 | 6 | Intense | none | 2.2 | 250 | Example |
| 6 | A | 50 | 40 | 60 | 180 | 6 | Intense | Weak | 2.2 | 225 | Example |
| 7 | A | 50 | 70 | 30 | 120 | 6 | Moderate | none | 2.2 | 200 | Example |
| 8 | A | 50 | 70 | 30 | 160 | 6 | Moderate | none | 2.2 | 225 | Example |
| 9 | A | 50 | 70 | 30 | 230 | 6 | Intense | none | 2.2 | 275 | Example |
| 10 | A | 50 | 70 | 30 | 260 | 6 | Intense | Weak | 2.2 | 225 | Example |
| 11 | A | 50 | 70 | 30 | 180 | 2 | Moderate | none | 2.2 | 225 | Example |
| 12 | A | 50 | 70 | 30 | 180 | 12 | Intense | none | 2.2 | 275 | Example |
| 13 | A | 50 | 70 | 30 | 180 | 24 | Intense | none | 2.2 | 275 | Example |
| 14 | A | 50 | 70 | 30 | 180 | 36 | Intense | Very slight | 2.2 | 250 | Example |
| 15 | A | 50 | 70 | 30 | 180 | 48 | Intense | Weak | 2.2 | 225 | Example |
| 16 | A | 50 | 100 | 0 | 180 | 6 | none | none | Not solidified | | Comparative Example |
| 17 | A | 50 | 30 | 70 | 180 | 6 | Intense | moderate | 2 | 180 | Example |
| 18 | A | 50 | 70 | 30 | 270 | 6 | Intense | Intense | 2.2 | 160 | Example |
| 19 | A | 50 | 70 | 30 | 180 | 1 | Weak | none | 2 | 160 | Example |

TABLE 3

| No. | Kind of steel-making slag | Existing ratio (%) of particles ≦ 5 mm | Steel-making Slag (wt. %) | Kind of steel-making slag | Existing ratio (%) of particles ≦ 5 mm | Slag (wt. %) | Fly ash (wt. %) | Autoclave curing Temperature (° C.) | Time (hr.) |
|---|---|---|---|---|---|---|---|---|---|
| 20 | A | 50 | 70 | | | | 30 | 180 | 60 |
| 21 | A | 50 | 0 | | | | 100 | 180 | 6 |
| 22 | A | 50 | 70 | | | | 30 | 180 | 6 |
| 23 | A | 40 | 70 | | | | 30 | 180 | 6 |
| 24 | B | 50 | 70 | | | | 30 | 180 | 6 |
| 25 | C | 50 | 70 | | | | 30 | 180 | 6 |
| 26 | D | 50 | 70 | | | | 30 | 180 | 6 |
| 27 | E | 50 | 70 | | | | 30 | 180 | 6 |
| 28 | F | 50 | 70 | | | | 30 | 180 | 6 |
| 29 | B | 50 | 70 | | | | 30 | 180 | 6 |
| 30 | C | 40 | 70 | | | | 30 | 180 | 6 |
| 31 | D | 40 | 70 | | | | 30 | 180 | 6 |
| 32 | E | 40 | 70 | | | | 30 | 180 | 6 |
| 33 | F | 40 | 70 | | | | 30 | 180 | 6 |
| 34 | A | 40 | 70 | B | 50 | 10 | 20 | 180 | 6 |
| 35 | C | 50 | 40 | D | 50 | 40 | 20 | 180 | 6 |
| 36 | E | 50 | 40 | F | 50 | 40 | 20 | 180 | 6 |

TABLE 3-continued

| | X-ray diffraction peak | | Specific | Compressive strength | |
|---|---|---|---|---|---|
| No. | Tobermorite | Hydrogarnet | gravity | (kgf/cm$^2$) | Remarks |
| 20 | Intense | Intense | 2.2 | 160 | Example |
| 21 | none | none | Not solidified | — | Comparative Example |
| 22 | Intense | none | 2.2 | 275 | Example |
| 23 | Weak | none | 2.2 | 60 | Comparative Example |
| 24 | Intense | none | 2.2 | 250 | Example |
| 25 | Intense | none | 2.2 | 250 | Example |
| 26 | Intense | none | 2.2 | 250 | Example |
| 27 | Intense | none | 2.2 | 250 | Example |
| 28 | Intense | none | 2.2 | 250 | Example |
| 29 | Weak | none | 2.2 | 50 | Comparative Example |
| 30 | Weak | none | 2.2 | 50 | Comparative Example |
| 31 | Weak | none | 2.2 | 50 | Comparative Example |
| 32 | Weak | none | 2.2 | 40 | Comparative Example |
| 33 | Weak | none | 2.2 | 40 | Comparative Example |
| 34 | moderate | none | 2.4 | 250 | Example |
| 35 | moderate | none | 2.4 | 250 | Example |
| 36 | moderate | none | 2.4 | 250 | Example |

As is clear from Table 2 and Table 3, the compacts heated and cured by the conditions of this invention show the existence of the tobermorite phase and all the materials show good solidified states in appearance in spite of the kinds of the steel-making slags being different. That is, the solidification of each steel-making slag in this invention was successively accomplished. Also, in these solidified products, the specific gravity thereof is at least about 2.0 and the compressive strength thereof is at least about 160 kgf/cm$^2$, and thereafter when the products were allowed to stand for about 6 months in the air, neither expansion nor powdering occurred, which showed that the products were physically and chemically stabilized. The results suggest that by the solidification of each mixed powder obtained by compounding a large amount of steel-making slag and fly ash, inorganic materials suitable as roadbed materials and building and civil engineering materials are consistently formed.

On the other hand, the compacts treated under conditions other than those of this invention were not solidified or even when they were solidified, they were weak. Also, in the compacts which were not solidified, the tobermorite phase was not found, whereby it could be confirmed that the idea of the present invention was correct.

(2) The case in which the substance containing at least about 30% by weight of SiO$_2$ is the fine powder of granulated, blast furnace slag:

Using each of the steel-making slags having the compositions and properties shown in Table 4 and the fine powder of the granulated blast furnace slag shown in the same table, the solidification method of steel-making slag of this invention was practiced. The compounding ratios and the curing conditions are shown in Table 5 and Table 6. Table 5 shows Nos. 37 to 61 (Examples) and Nos. 62 and 67 (Comparative Examples) each obtained by mixing each powdery and granular steel-making slag and the fine powder of the granulated blast furnace slag and solidifying the mixture in the presence of water. Table 6 shows Nos. 68 to 92 (Examples) and Nos. 93 to 98 (Comparative Examples) each obtained by mixing each of the powdery and granular steel-making slags and the fine powder of the granulated blast furnace slag and solidifying by replacing the air in a normal-pressure treatment vessel or in an autoclave with CO$_2$ in the presence of water. The compressive strengths of the solidified materials produced are also shown in Table 5 and Table 6.

As is clear from Table 5 and Table 6, by using each of the steel-making slags containing at least about 50% by weight of a powdery steel-making slag having a particle size not greater than about 5 nm and the fine powders of granulated blast furnace slag, solidified products which had a long-term compressive strength of at least about 160 kg/cm$^2$ and did not have an expansion-breaking property for a long period of time could be obtained.

TABLE 4

| | Kind of steel-making slag | Composition of raw material (wt. %) | | | | | |
|---|---|---|---|---|---|---|---|
| | | SiO$_2$ | CaO | Al$_2$O$_3$ | MgO | t-Fe | P$_2$O$_5$ |
| Molten Iron pre-treatment slag | A | 25 | 45 | 3 | 1 | 10 | 3 |
| Converter slag | B | 12 | 50 | 3 | 5 | 10 | 2 |
| Chromium ore melt reducing furnace slag | C | 18 | 41 | 17 | 18 | 1 | 0 |
| Stainless steel refining decarburization furnace slag | D | 22 | 40 | 3 | 3 | 3 | 0 |
| Granulated blast furnace slag | — | 34 | 41 | 14 | 7 | 0.3 | 0 |

TABLE 5

| No. | Steel-making Slag Kind | Particle size | Existing ratio (%) of particles ≦ 5 mm | Weight ratio (wt %) | Fine powder of granulated blast furnace slag Particle size | Weight ratio (wt %) | Other additive Kind | Outside multiplication (wt %) | Autoclave curing Temperature (°C.) | Pressure kgf/cm² | Time | Specific gravity | Compressive strength kgf/cm² | Remarks |
|---|---|---|---|---|---|---|---|---|---|---|---|---|---|---|
| 37 | A | <5 mm | 100 | 10 | <100 μm | 90 | none | | 20 | 1 | 14 days | 2 | 350 | Example |
| 38 | A | <10 mm | 50 | 90 | <100 μm | 10 | none | | 180 | 10 | 24 hr | 2 | 270 | Example |
| 39 | A | <40 mm | 80 | 30 | <100 μm | 70 | NaOH | 5 | 20 | 1 | 14 days | 2 | 308 | Example |
| 40 | A | <5 mm | 100 | 30 | <100 μm | 70 | NaOH | 1 | 180 | 10 | 5 hr | 2 | 445 | Example |
| 41 | A | <10 mm | 70 | 60 | <100 μm | 40 | CaCO3 | 5 | 180 | 10 | 24 hr | 2 | 325 | Example |
| 42 | A | <5 mm | 100 | 10 | <100 μm | 90 | none | | 20 | 1 | 14 days | 2 | 358 | Example |
| 43 | B | <5 mm | 100 | 10 | <100 μm | 90 | none | | 20 | 1 | 30 days | 2 | 256 | Example |
| 44 | B | <10 mm | 50 | 90 | <100 μm | 10 | none | | 100 | 1 | 7 days | 2 | 282 | Example |
| 45 | B | <5 mm | 100 | 50 | <100 μm | 50 | Ca(OH)2 | 3 | 180 | 10 | 24 hr | 2 | 411 | Example |
| 46 | B | <40 mm | 90 | 40 | <100 μm | 60 | Na2CO3 | 10 | 180 | 1 | 24 hr | 2 | 314 | Example |
| 47 | B | <5 mm | 100 | 70 | <100 μm | 30 | Cement | 2 | 20 | 1 | 30 days | 2 | 369 | Example |
| 48 | C | <5 mm | 100 | 60 | <100 μm | 40 | none | | 20 | 1 | 7 days | 2 | 227 | Example |
| 49 | C | <10 mm | 50 | 80 | <100 μm | 20 | none | | 180 | 10 | 24 hr | 2 | 255 | Example |
| 50 | C | <5 mm | 100 | 50 | <100 μm | 50 | CaCO3 | 10 | 20 | 1 | 30 days | 2 | 324 | Example |
| 51 | C | <5 mm | 100 | 10 | <100 μm | 90 | Cement | 6 | 100 | 1 | 7 days | 2 | 299 | Example |
| 52 | C | <5 mm | 100 | 90 | <100 μm | 10 | CaO | 1 | 20 | 1 | 14 days | 2 | 272 | Example |
| 53 | D | <5 mm | 100 | 90 | <100 μm | 10 | none | | 20 | 1 | 14 days | 2 | 267 | Example |
| 54 | D | <10 mm | 50 | 40 | <100 μm | 60 | none | | 20 | 1 | 30 days | 2 | 240 | Example |
| 55 | D | <40 mm | 0 | 70 | <100 μm | 30 | none | | 180 | 10 | 5 hr | 2 | 293 | Example |
| 56 | D | <5 mm | 100 | 30 | <100 μm | 70 | none | | 180 | 10 | 24 hr | 2 | 218 | Example |
| 57 | D | <5 mm | 100 | 50 | <100 μm | 50 | Na2CO3 | 5 | 100 | 1 | 7 days | 2 | 460 | Example |
| 58 | D | <10 mm | 70 | 20 | <100 μm | 80 | NaOH | 8 | 20 | 1 | 14 days | 2 | 450 | Example |
| 59 | D | <5 mm | 100 | 30 | <100 μm | 70 | Ca(OH)2 | 5 | 20 | 1 | 30 days | 2 | 403 | Example |
| 60 | A | <5 mm | 100 | 70 | <100 μm | 30 | Sodium silicate | 2 | 180 | 1 | 14 days | 2 | 485 | Example |
| 61 | B | <10 mm | 80 | 60 | <100 μm | 40 | Sodium silicate | 4 | 180 | 10 | 24 hr | 2 | 470 | Example |
| 62 | A | <10 mm | 80 | 100 | — | 0 | none | | 180 | 10 | 24 hr | 2 | Not solidified | Comparative Example |
| 63 | B | <5 mm | 100 | 100 | — | 0 | Na2CO3 | 10 | 180 | 10 | 24 hr | 2 | Not solidified | Comparative Example |
| 64 | B | <5 mm | 100 | 40 | <200 μm | 60 | none | | 20 | 1 | 30 days | 2 | 40 | Comparative Example |
| 65 | C | <10 mm | 10 | 40 | <200 μm | 60 | NaOH | 2 | 180 | 10 | 5 hr | 2 | 55 | Comparative Example |
| 66 | D | <5 mm | — | 0 | <100 μm | 100 | none | | 180 | 10 | 24 hr | 2 | Not solidified | Comparative Example |
| 67 | A | <5 mm | 100 | 100 | — | 0 | Sodium silicate | 2 | 20 | 1 | 14 days | 2 | Not solidified | Comparative Example |

TABLE 6

| No. | Steel-making Slag Kind | Particle size | Existing ratio (%) of particles ≤ 5 mm | Weight ratio (wt %) | Fine powder of granulated blast furnace slag Particle size | Weight ratio (wt %) | Other additive Kind | Outside multiplication (wt %) | Autoclave curing Temperature (°C.) | Pressure kgf/cm² | Time | Specific gravity | Compressive strength kgf/cm² | Remarks |
|---|---|---|---|---|---|---|---|---|---|---|---|---|---|---|
| 68 | A | <5 mm | 100 | 10 | <100 μm | 90 | none | | 20 | 1 | 14 days | 2 | 420 | Example |
| 69 | A | <10 mm | 50 | 90 | <100 μm | 10 | none | | 180 | 10 | 24 hr | 2 | 324 | Example |
| 70 | A | <40 mm | 80 | 30 | <100 μm | 70 | none | | 20 | 1 | 14 days | 2 | 369.6 | Example |
| 71 | A | <5 mm | 100 | 70 | <100 μm | 30 | NaOH | 5 | 180 | 10 | 5 hr | 2 | 534 | Example |
| 72 | A | <10 mm | 70 | 60 | <100 μm | 40 | NaOH | 1 | 180 | 10 | 24 hr | 2 | 390 | Example |
| 73 | A | <5 mm | 100 | 10 | <100 μm | 90 | CaCO3 | 5 | 20 | 1 | 14 days | 2 | 427.2 | Example |
| 74 | B | <5 mm | 100 | 10 | <100 μm | 90 | none | | 20 | 1 | 30 days | 2 | 307.2 | Example |
| 75 | B | <10 mm | 50 | 90 | <100 μm | 10 | none | | 20 | 1 | 7 days | 2 | 338.4 | Example |
| 76 | B | <5 mm | 100 | 50 | <100 μm | 50 | Ca(OH)2 | 3 | 180 | 10 | 24 hr | 2 | 493.2 | Example |
| 77 | B | <40 mm | 90 | 40 | <100 μm | 60 | Na2CO3 | 10 | 180 | 1 | 24 hr | 2 | 376.8 | Example |
| 78 | B | <5 mm | 100 | 70 | <100 μm | 30 | Cement | 2 | 20 | 1 | 30 days | 2 | 442.8 | Example |
| 79 | C | <5 mm | 100 | 60 | <100 μm | 40 | none | | 20 | 1 | 7 days | 2 | 272.4 | Example |
| 80 | C | <10 mm | 50 | 80 | <100 μm | 20 | none | | 100 | 1 | 24 hr | 2 | 306 | Example |
| 81 | C | <5 mm | 100 | 50 | <100 μm | 50 | CaCO3 | 10 | 180 | 10 | 30 days | 2 | 388.8 | Example |
| 82 | C | <5 mm | 100 | 10 | <100 μm | 90 | Cement | 6 | 20 | 1 | 7 days | 2 | 358.8 | Example |
| 83 | C | <5 mm | 100 | 90 | <100 μm | 10 | CaO | 1 | 100 | 1 | 14 days | 2 | 326.4 | Example |
| 84 | D | <5 mm | 100 | 90 | <100 μm | 10 | none | | 20 | 1 | 14 days | 2 | 320.4 | Example |
| 85 | D | <10 mm | 50 | 40 | <100 μm | 60 | none | | 20 | 1 | 30 days | 2 | 288 | Example |
| 86 | D | <40 mm | 0 | 70 | <100 μm | 30 | none | | 180 | 10 | 5 hr | 2 | 351.6 | Example |
| 87 | D | <5 mm | 100 | 30 | <100 μm | 70 | none | | 180 | 10 | 24 hr | 2 | 261.6 | Example |
| 88 | D | <5 mm | 100 | 50 | <100 μm | 50 | Na2CO3 | 5 | 100 | 1 | 7 days | 2 | 552 | Example |
| 89 | D | <10 mm | 70 | 80 | <100 μm | 20 | NaOH | 8 | 20 | 1 | 14 days | 2 | 540 | Example |
| 90 | D | <5 mm | 100 | 30 | <100 μm | 70 | Ca(OH)2 | 5 | 20 | 1 | 30 days | 2 | 483.6 | Example |
| 91 | A | <5 mm | 100 | 70 | <100 μm | 30 | Sodium silicate | 2 | 180 | 1 | 14 days | 2 | 582 | Example |
| 92 | B | <10 mm | 80 | 60 | <100 μm | 40 | Sodium silicate | 4 | 180 | 10 | 24 hr | 2 | 564 | Example |
| 93 | A | <5 mm | 100 | 100 | — | 0 | none | | 180 | 10 | 24 hr | | Not solidified | Comparative Example |
| 94 | B | <5 mm | 100 | 100 | — | 0 | Na2CO3 | 10 | 180 | 10 | 24 hr | | Not solidified | Comparative Example |
| 95 | B | <5 mm | 100 | 40 | <200 μm | 60 | none | | 20 | 1 | 30 days | 2 | 48 | Comparative Example |
| 96 | C | <10 mm | 10 | 40 | <200 μm | 60 | NaOH | 2 | 180 | 10 | 5 hr | 2 | 66 | Comparative Example |
| 97 | D | <5 mm | — | 0 | <100 μm | 100 | none | | 180 | 10 | 24 hr | | Not solidified | Comparative Example |
| 98 | A | <5 mm | 100 | 100 | — | 0 | Sodium silicate | 2 | 20 | 1 | 14 days | | Not solidified | Comparative Example |

(3) The case in which the substance containing at least about 30% $SiO_2$ is the fine powder of granulated blast furnace slag and fly ash:

Using each of the steel-making slags having the components and properties shown in Table 4 above and the fine powder of the granulated blast furnace slag shown in the same table, and the fly ash having the components and the properties shown in Table 1 above, the solidification method of steel-making slag of this invention was practiced. The compounding ratios and the curing conditions are shown in Table 7 and Table 8. Table 7 shows Nos. 99 to 124 (Examples) and Nos. 125 to 130 (Comparative Examples) each obtained by mixing the steel-making slag containing at least about 50% by weight of a powdery steel-making slag having a particle size not greater than about 5 mm, the fine powder of the granulated blast furnace slag, and the fly ash and solidifying the mixture in the presence of water. Table 8 shows Nos. 131 to 156 (Examples) and Nos. 157 to 162 (Comparative Examples) each obtained by mixing the steel-making slag containing at least about 50% by weight of a powdery steel-making slag having a particle size not greater than about 5 mm, the fine powder of the granulated blast furnace slag, and the fly ash, and solidifying the mixture by replacing the air in a normal pressure treatment vessel or in an autoclave with $CO_2$ in the presence of water. The compressive strengths of the solidified products produced are also shown in Table 7 and Table 8.

TABLE 7

| | Steel-making Slag | | | Fine powder of granulated blast furnace slag | | | Other additive | | Autoclave curing | | | | Compressive strength kgf/cm² | Remarks |
|---|---|---|---|---|---|---|---|---|---|---|---|---|---|---|
| No. | Kind | Particle size | Existing ratio (%) of particles ≤ 5 mm | Weight ratio (wt %) | Particle size | Weight ratio (wt %) | Fly ash (wt. %) | Kind | Outside multiplication (wt %) | Temperature (°C.) | Pressure kgf/cm² | Time | Specific gravity | | |
| 99 | A | <5 mm | 100 | 10 | <100 μm | 60 | 30 | none | | 20 | 1 | 14 days | 2 | 280 | Example |
| 100 | A | <10 mm | 50 | 50 | <100 μm | 20 | 30 | none | | 180 | 10 | 24 hr | 2 | 430 | Example |
| 101 | A | <40 mm | 70 | 80 | <100 μm | 10 | 10 | none | | 20 | 1 | 14 days | 2 | 250 | Example |
| 102 | A | <5 mm | 100 | 60 | <100 μm | 20 | 20 | NaOH | 5 | 180 | 10 | 5 hr | 2 | 560 | Example |
| 103 | A | <10 mm | 80 | 20 | <100 μm | 50 | 30 | none | | 180 | 10 | 24 hr | 2 | 350 | Example |
| 104 | A | <40 mm | 70 | 40 | <100 μm | 20 | 40 | none | | 20 | 1 | 14 days | 2 | 260 | Example |
| 105 | A | <40 mm | 50 | 70 | <100 μm | 20 | 10 | Sodium silicate | 2 | 20 | 1 | 14 days | 2 | 530 | Example |
| 106 | B | <5 mm | 100 | 10 | <100 μm | 60 | 30 | none | | 20 | 1 | 30 days | 2 | 280 | Example |
| 107 | B | <5 mm | 100 | 50 | <100 μm | 20 | 30 | none | | 20 | 1 | 7 days | 2 | 300 | Example |
| 108 | B | <10 mm | 90 | 80 | <100 μm | 10 | 10 | none | | 180 | 10 | 24 hr | 2 | 300 | Example |
| 109 | B | <40 mm | 60 | 60 | <100 μm | 20 | 20 | NaOH | 2 | 180 | 10 | 24 hr | 2 | 500 | Example |
| 110 | B | <5 mm | 100 | 20 | <100 μm | 50 | 30 | none | | 20 | 1 | 30 days | 2 | 350 | Example |
| 111 | B | <10 mm | 70 | 40 | <100 μm | 20 | 40 | none | | 100 | 1 | 7 days | 2 | 290 | Example |
| 112 | B | <40 mm | 50 | 60 | <100 μm | 20 | 20 | Sodium silicate | 4 | 180 | 10 | 24 hr | 2 | 570 | Example |
| 113 | C | <5 mm | 100 | 10 | <100 μm | 60 | 30 | none | | 180 | 10 | 24 hr | 2 | 420 | Example |
| 114 | C | <10 mm | 50 | 50 | <100 μm | 20 | 30 | NaOH | 10 | 20 | 1 | 30 days | 2 | 350 | Example |
| 115 | C | <5 mm | 100 | 80 | <100 μm | 10 | 10 | none | | 100 | 1 | 7 days | 2 | 290 | Example |
| 116 | C | <5 mm | 100 | 60 | <100 μm | 20 | 20 | none | | 20 | 1 | 14 days | 2 | 250 | Example |
| 117 | D | <10 mm | 90 | 20 | <100 μm | 50 | 30 | none | | 20 | 1 | 14 days | 2 | 260 | Example |
| 118 | D | <40 mm | 70 | 40 | <100 μm | 20 | 40 | none | | 20 | 1 | 30 days | 2 | 220 | Example |
| 119 | D | <5 mm | 100 | 10 | <100 μm | 60 | 30 | NaOH | 10 | 180 | 10 | 5 hr | 2 | 450 | Example |
| 120 | D | <10 mm | 80 | 50 | <100 μm | 20 | 30 | none | | 180 | 10 | 24 hr | 2 | 350 | Example |
| 121 | D | <40 mm | 50 | 80 | <100 μm | 10 | 10 | none | | 100 | 1 | 7 days | 2 | 300 | Example |
| 122 | D | <5 mm | 100 | 60 | <100 μm | 20 | 20 | none | | 20 | 1 | 14 days | 2 | 230 | Example |
| 123 | D | <10 mm | 90 | 20 | <100 μm | 50 | 30 | none | | 20 | 1 | 30 days | 2 | 250 | Example |
| 124 | D | <40 mm | 70 | 40 | <100 μm | 20 | 40 | none | | 180 | 10 | 24 hr | 2 | 470 | Example |
| 125 | A | <10 mm | 50 | 100 | <100 μm | 0 | 0 | none | | 180 | 10 | 24 hr | 2 | Not solidified | Comparative Example |
| 126 | B | <5 mm | 100 | 100 | <100 μm | 0 | 0 | none | | 180 | 10 | 24 hr | 2 | Not solidified | Comparative Example |
| 127 | B | <5 mm | 100 | 40 | <200 μm | 20 | 40 | none | | 20 | 1 | 30 days | 2 | 60 | Comparative Example |
| 128 | C | <10 mm | 30 | 40 | <200 μm | 50 | 10 | NaOH | 2 | 180 | 10 | 5 hr | 2 | 80 | Comparative Example |
| 129 | D | <5 mm | 100 | 0 | <100 μm | 50 | 50 | none | | 180 | 10 | 24 hr | Not solidified | | Comparative Example |
| 130 | A | <40 mm | 50 | 100 | <100 μm | 0 | 0 | Sodium silicate | 4 | 20 | 1 | 14 days | 2 | Not solidified | Comparative Example |

TABLE 8

| No. | Steel-making Slag Kind | Particle size | Existing ratio (%) of particles ≦ 5 mm | Weight ratio (wt %) | Fine powder of granulated blast furnace slag Particle size | Weight ratio (wt %) | Fly ash (wt. %) | Other additive Kind | Outside multiplication (wt %) | Autoclave curing Temperature (°C.) | Pressure kgf/cm² | Time | Specific gravity | Compressive strength kgf/cm² | Remarks |
|---|---|---|---|---|---|---|---|---|---|---|---|---|---|---|---|
| 131 | A | <5 mm | 100 | 10 | <100 μm | 60 | 30 | none | | 20 | 1 | 14 days | 2 | 330 | Example |
| 132 | A | <10 mm | 50 | 50 | <100 μm | 20 | 30 | none | | 180 | 10 | 24 hr | 2 | 470 | Example |
| 133 | A | <40 mm | 70 | 80 | <100 μm | 10 | 10 | none | | 20 | 1 | 14 days | 2 | 310 | Example |
| 134 | A | <5 mm | 100 | 60 | <100 μm | 20 | 20 | NaOH | 5 | 180 | 10 | 5 hr | 2 | 600 | Example |
| 135 | A | <10 mm | 80 | 20 | <100 μm | 50 | 30 | none | | 180 | 10 | 24 hr | 2 | 380 | Example |
| 136 | A | <40 mm | 70 | 40 | <100 μm | 20 | 40 | none | | 20 | 1 | 14 days | 2 | 300 | Example |
| 137 | A | <40 mm | 50 | 70 | <100 μm | 20 | 10 | Sodium silicate | 2 | 20 | 1 | 14 days | 2 | 580 | Example |
| 138 | B | <5 mm | 100 | 10 | <100 μm | 60 | 30 | none | | 20 | 1 | 30 days | 2 | 320 | Example |
| 139 | B | <5 mm | 100 | 50 | <100 μm | 20 | 30 | none | | 20 | 1 | 7 days | 2 | 540 | Example |
| 140 | B | <10 mm | 90 | 80 | <100 μm | 10 | 10 | none | | 180 | 10 | 24 hr | 2 | 350 | Example |
| 141 | B | <40 mm | 60 | 60 | <100 μm | 20 | 20 | none | | 180 | 10 | 24 hr | 2 | 530 | Example |
| 142 | B | <5 mm | 100 | 20 | <100 μm | 50 | 30 | NaOH | 2 | 20 | 1 | 30 days | 2 | 390 | Example |
| 143 | B | <10 mm | 70 | 40 | <100 μm | 20 | 40 | none | | 100 | 1 | 7 days | 2 | 340 | Example |
| 144 | B | <40 mm | 50 | 60 | <100 μm | 20 | 20 | Sodium silicate | 4 | 180 | 10 | 24 hr | 2 | 600 | Example |
| 145 | C | <5 mm | 80 | 10 | <100 μm | 60 | 30 | none | | 180 | 10 | 24 hr | 2 | 450 | Example |
| 146 | C | <5 mm | 100 | 10 | <100 μm | 60 | 30 | none | | 180 | 10 | 24 hr | 2 | 450 | Example |
| 147 | C | <40 mm | 50 | 80 | <100 μm | 10 | 10 | none | | 100 | 1 | 7 days | 2 | 300 | Example |
| 148 | C | <5 mm | 100 | 60 | <100 μm | 20 | 20 | none | | 20 | 1 | 14 days | 2 | 290 | Example |
| 149 | C | <10 mm | 90 | 20 | <100 μm | 50 | 30 | none | | 20 | 1 | 14 days | 2 | 320 | Example |
| 150 | D | <40 mm | 70 | 40 | <100 μm | 20 | 40 | none | | 20 | 1 | 30 days | 2 | 260 | Example |
| 151 | D | <10 mm | 100 | 10 | <100 μm | 60 | 30 | NaOH | 10 | 180 | 10 | 5 hr | 2 | 500 | Example |
| 152 | D | <10 mm | 80 | 50 | <100 μm | 20 | 30 | none | | 180 | 10 | 24 hr | 2 | 410 | Example |
| 153 | D | <40 mm | 50 | 80 | <100 μm | 10 | 10 | none | | 100 | 1 | 7 days | 2 | 340 | Example |
| 154 | D | <5 mm | 100 | 80 | <100 μm | 20 | 20 | none | | 180 | 10 | 14 days | 2 | 270 | Example |
| 155 | D | <10 mm | 90 | 20 | <100 μm | 50 | 30 | none | | 20 | 1 | 30 days | 2 | 300 | Example |
| 156 | D | <40 mm | 70 | 40 | <100 μm | 20 | 40 | Sodium silicate | 2 | 180 | 10 | 24 hr | 2 | 520 | Example |
| 157 | A | <10 mm | 50 | 100 | <100 μm | 0 | 0 | none | | 180 | 10 | 24 hr | 2 | Not solidified | Comparative Example |
| 158 | B | <5 mm | 100 | 100 | <100 μm | 0 | 0 | none | | 180 | 10 | 24 hr | 2 | Not solidified | Comparative Example |
| 159 | B | <5 mm | 100 | 40 | <200 μm | 20 | 40 | none | | 20 | 1 | 30 days | 2 | 70 | Comparative Example |
| 160 | C | <10 mm | 100 | 40 | <200 μm | 50 | 10 | NaOH | 2 | 180 | 10 | 5 hr | 2 | 90 | Comparative Example |
| 161 | D | <5 mm | 100 | 0 | <100 μm | 50 | 50 | none | | 180 | 10 | 24 hr | 2 | Not solidified | Comparative Example |
| 162 | A | <40 mm | 50 | 100 | <100 μm | 0 | 0 | Sodium silicate | 4 | 20 | 1 | 14 days | 2 | 10 | Comparative Example |

As is clear from Table 7 and Table 8, by using the steel-making slag containing at least about 50% by weight of a powdery steel-making slag having a particle size not greater than about 5 mm, the fine powder of the granulated blast furnace slag, and the fly ash, solidified products having a long-term compressive strength of at least about 160 kg/cm$^2$ and showing no expansion-breaking property for a long period of time could be obtained.

In each of the above-described cases, after adding water to each mixed powder before solidification, the mixed powder was solidified at normal temperature or under high temperature and high pressure by an autoclave. The appropriate addition amount of water when kneading cannot be unconditionally determined because the amount differs according to the kinds and compounding ratios of the raw materials constituting the mixed powder by in general, the amount may be determined by considering that the water is uniformly applied to the whole mixed powder by kneading, that the whole mixed powder becomes a hard paste formed by kneading, and that the strength is not lowered by excess water remaining after solidification.

From such a viewpoint, when the solidification of slag was carried out by changing the addition amount of water when kneading under the various conditions shown in Table 9 below, under each of the conditions shown by Nos. 163 to 178, before solidification, the mixed powder of slags became a hard paste and water spread all over the pasty mixture, and the solidified products after solidification showed a high strength.

TABLE 9

| No. | Steel-making Slag | | | | Fine powder of granulated blast furnace slag | | Fly ash (wt. %) | Water outside multiplication at kneading (wt %) |
|---|---|---|---|---|---|---|---|---|
| | Kind | Particle size | Existing ratio (%) of particles ≦ 5 mm | Weight ratio (wt %) | Particle size | Weight ratio (wt %) | | |
| 163 | A | <5 mm | 100 | 80 | <100 μm | 0 | 20 | 21 |
| 164 | A | <40 mm | 50 | 50 | <100 μm | 0 | 50 | 15 |
| 165 | A | <5 mm | 100 | 70 | <100 μm | 0 | 30 | 23 |
| 166 | A | <40 mm | 50 | 70 | <100 μm | 0 | 30 | 17 |
| 167 | A | <40 mm | 50 | 70 | <100 μm | 0 | 30 | 15 |
| 168 | A | <5 mm | 100 | 70 | <100 μm | 30 | 0 | 19 |
| 169 | A | <40 mm | 80 | 30 | <100 μm | 70 | 0 | 16 |
| 170 | B | <10 mm | 80 | 60 | <100 μm | 40 | 0 | 20 |
| 171 | B | <40 mm | 70 | 60 | <100 μm | 40 | 0 | 18 |
| 172 | B | <40 mm | 60 | 90 | <100 μm | 10 | 0 | 15 |
| 173 | B | <5 mm | 100 | 10 | <100 μm | 60 | 30 | 22 |
| 174 | B | <5 mm | 100 | 60 | <100 μm | 20 | 20 | 17 |
| 175 | B | <40 mm | 70 | 70 | <100 μm | 20 | 10 | 15 |
| 176 | B | <5 mm | 100 | 60 | <100 μm | 20 | 20 | 18 |
| 177 | C | <40 mm | 50 | 80 | <100 μm | 10 | 10 | 15 |
| 178 | C | <40 mm | 50 | 80 | <100 μm | 10 | 10 | 17 |

| No. | Other additive | | Autoclave curing | | | Specific gravity | Compressive strength kgf/cm$^2$ | Remarks |
|---|---|---|---|---|---|---|---|---|
| | Kind | Outside multiplication (wt %) | Temperature (° C.) | Pressure kgf/cm$^2$ | Time | | | |
| 163 | none | | 180 | 10 | 6 hr | 2 | 300 | Example |
| 164 | none | | 180 | 10 | 6 hr | 2 | 290 | Example |
| 165 | none | | 180 | 10 | 6 hr | 2 | 300 | Example |
| 166 | none | | 180 | 10 | 6 hr | 2 | 280 | Example |
| 167 | none | | 180 | 10 | 6 hr | 2 | 290 | Example |
| 168 | NaOH | 5 | 180 | 10 | 5 hr | 2 | 500 | Example |
| 169 | none | | 20 | 1 | 14 days | 2 | 340 | Example |
| 170 | Sodium silicate | 2 | 180 | 10 | 6 hr | 2 | 510 | Example |
| 171 | none | | 100 | 1 | 7 days | 2 | 270 | Example |
| 172 | none | | 20 | 1 | 14 days | 2 | 310 | Example |
| 173 | none | | 20 | 1 | 14 days | 2 | 330 | Example |
| 174 | NaOH | 5 | 180 | 10 | 5 hr | 2 | 600 | Example |
| 175 | Sodium silicate | 2 | 20 | 1 | 14 days | 2 | 580 | Example |
| 176 | none | | 180 | 10 | 24 hr | 2 | 530 | Example |
| 177 | none | | 100 | 1 | 7 days | 2 | 300 | Example |
| 178 | none | | 100 | 1 | 7 days | 2 | 340 | Example |

Also, in Table 10, the addition amounts of water when kneading were the same as in Table 9, and $CO_2$ was added to the atmosphere at solidification In this case, before solidification, the mixed powder of slags became a hard paste and water spread all over the paste, and the solidified products after solidification showed a higher strength than the examples of Table 9.

TABLE 10

| No. | Steel-making Slag Kind | Particle size | Existing ratio (%) of particles ≤ 5 mm | Weight ratio (wt %) | Fine powder of granulated blast furnace slag Particle size | Weight ratio (wt %) | Fly ash (wt. %) | Water outside multiplication at kneading (wt %) |
|---|---|---|---|---|---|---|---|---|
| 179 | A | <5 mm | 100 | 80 | <100 μm | 0 | 20 | 21 |
| 180 | A | <40 mm | 50 | 50 | <100 μm | 0 | 50 | 15 |
| 181 | A | <5 mm | 100 | 70 | <100 μm | 0 | 30 | 23 |
| 182 | A | <40 mm | 50 | 70 | <100 μm | 0 | 30 | 17 |
| 183 | A | <40 mm | 50 | 70 | <100 μm | 0 | 30 | 15 |
| 184 | A | <5 mm | 100 | 70 | <100 μm | 30 | 0 | 19 |
| 185 | A | <40 mm | 80 | 30 | <100 μm | 70 | 0 | 16 |
| 186 | B | <10 mm | 80 | 60 | <100 μm | 40 | 0 | 20 |
| 187 | B | <40 mm | 70 | 60 | <100 μm | 40 | 0 | 18 |
| 188 | B | <40 mm | 60 | 90 | <100 μm | 10 | 0 | 15 |
| 189 | B | <5 mm | 100 | 10 | <100 μm | 60 | 30 | 22 |
| 190 | B | <5 mm | 100 | 60 | <100 μm | 20 | 20 | 17 |
| 191 | B | <40 mm | 70 | 70 | <100 μm | 20 | 10 | 15 |
| 192 | B | <5 mm | 100 | 60 | <100 μm | 20 | 20 | 18 |
| 193 | C | <40 mm | 50 | 80 | <100 μm | 10 | 10 | 15 |
| 194 | C | <40 mm | 50 | 80 | <100 μm | 10 | 10 | 17 |

| No. | Other additive Kind | Outside multiplication (wt %) | Autoclave curing Temperature (°C.) | Pressure kgf/cm² | Time | Specific gravity | Compressive strength kgf/cm² | Remarks |
|---|---|---|---|---|---|---|---|---|
| 179 | none | | 180 | 10 | 6 hr | 2 | 340 | Example |
| 180 | none | | 180 | 10 | 6 hr | 2 | 330 | Example |
| 181 | none | | 180 | 10 | 6 hr | 2 | 350 | Example |
| 182 | none | | 180 | 10 | 6 hr | 2 | 330 | Example |
| 183 | none | | 180 | 10 | 6 hr | 2 | 340 | Example |
| 184 | NaOH | 5 | 180 | 10 | 5 hr | 2 | 530 | Example |
| 185 | none | | 20 | 1 | 14 days | 2 | 370 | Example |
| 186 | Sodium silicate | 2 | 180 | 10 | 6 hr | 2 | 510 | Example |
| 187 | none | | 100 | 1 | 7 days | 2 | 330 | Example |
| 188 | none | | 20 | 1 | 14 days | 2 | 350 | Example |
| 189 | none | | 20 | 1 | 14 days | 2 | 370 | Example |
| 190 | NaOH | 5 | 180 | 10 | 5 hr | 2 | 650 | Example |
| 191 | Sodium silicate | 2 | 20 | 1 | 14 days | 2 | 620 | Example |
| 192 | none | | 180 | 10 | 24 hr | 2 | 570 | Example |
| 193 | none | | 100 | 1 | 7 days | 2 | 350 | Example |
| 194 | none | | 100 | 1 | 7 days | 2 | 390 | Example |

As explained above, according to the invention, by selecting the steel-making slag containing at least about 50% by weight of a powdery steel-making slag having a particle size not greater than about 5 mm from various kinds of steel-making slags, which have hitherto been treated as industrial wastes, and treating a mixed powder of the above-described steel-making slag and a substance containing at least about 30% by weight of $SiO_2$ under the proper conditions, a stable solidified material of the steel-making slag having a high strength can be obtained. As a result, from steel-making slags and substances containing at least about 30% by weight of $SiO_2$, such as fly ashes and fine powders of granulated blast furnace slags, which have hitherto been discarded as industrial wastes, inorganic materials capable of being utilized as roadbed materials, building and civil engineering materials, etc., can be provided. Accordingly, the present invention considerably contributes to the recycling of resources, the improvement of the environment, etc.

What is claimed is:

1. A method of solidifying a steel-making slag, which comprises the steps of:
    forming a mixture comprising from about 60 to about 80% by weight of a steel-making slag containing at least about 50% by weight of a powdery steel-making slag having a particle size not greater than about 5 mm and from about 20 to about 13% by weight of a fine powder of granulated blast furnace slag having a particle size not greater than about 100 μm; and
    solidifying said mixture by a hydration reaction.

2. The method as claimed in claim 1 wherein a compounding ratio of said mixture further comprises from about 20 to about 7% by weight of fly ash.

3. The method as claimed in claim 1 wherein said steel-making slag is at least one member selected from the group consisting of molten iron pre-treatment slag, melt reducing furnace slag, converter slag, electric furnace slag, secondary refining slag, and stainless steel slag.

4. The method as claimed in claim 1 wherein at least one member selected from the group consisting of oxides, hydroxides, and carbonates of alkali metals or alkaline earth metals is added to said mixture in an amount of from about 0.5 to about 10% by weight of said mixture, and the resultant mixture is solidified.

5. The method as claimed in claim 1 further comprising, before the forming step, the step of pre-treating the steel-making slag with water; and wherein the solidifying step comprises heating the mixture with steam.

6. The method as claimed in claim 5 wherein said heating is carried out at a temperature of from about 120 to about 260° C. for from about 2 to about 48 hours.

7. The method as claimed in claim 5 wherein carbon dioxide gas is added to said steam.

8. A solidified material formed by solidifying a mixture of a steel-making slag containing at least about 50% by weight of a powdery steel-making slag having a particle size not greater than about 5 mm and a substance containing at least about 30% by weight of $SiO_2$ by a hydration reaction, said solidified material containing at least about 20% of a tobermorite phase.

9. The solidified material as claimed in claim 8 wherein the substance containing at least about 30% by weight of $SiO_2$ is at least one member selected from the group consisting of granulated blast furnace slag, fly ash and mixtures thereof.

10. A method of solidifying a steel-making slag, which comprises the steps of:

forming a mixture comprising a steel-making slag containing at least about 50% by weight of a powdery steel-making slag having a particle size not greater than about 5 mm and a substance containing at least about 30% by weight of $SiO_2$; and solidifying said mixture by a hydration reaction to form a solidified material containing at least about 20% of a tobermorite phase.

\* \* \* \* \*